US007634232B2

(12) United States Patent
Waxman

(10) Patent No.: US 7,634,232 B2
(45) Date of Patent: Dec. 15, 2009

(54) DEVICE, SYSTEM AND METHOD OF COEXISTENCE MODE SWITCHING AMONG TRANSCEIVERS

(75) Inventor: Shai Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 11/385,902

(22) Filed: Mar. 22, 2006

(65) Prior Publication Data

US 2007/0224935 A1 Sep. 27, 2007

(51) Int. Cl.
*H04B 1/00* (2006.01)
*H04B 15/00* (2006.01)

(52) U.S. Cl. .............. 455/63.1; 455/41.1; 455/41.2; 455/41.3; 455/67.11; 455/502; 455/552.1; 455/553.1

(58) Field of Classification Search ........... 455/41.1, 455/41.2, 41.3, 63.1, 67.11, 502, 552.1, 553.1
See application file for complete search history.

(56) References Cited

U.S. PATENT DOCUMENTS 6,954,616 B2 * 10/2005 Liang et al. ............. 455/63.1
7,436,789 B2 * 10/2008 Caliskan et al. ......... 370/310.1
2005/0215197 A1 * 9/2005 Chen et al. ............... 455/41.2
2006/0030266 A1 * 2/2006 Desai et al. .............. 455/41.2
2006/0211372 A1 * 9/2006 Shellhammer et al. ..... 455/41.2
2007/0066222 A1 * 3/2007 Tao et al. ................. 455/41.2
2007/0080781 A1 4/2007 Ginzburg et al.

OTHER PUBLICATIONS

U.S. Appl. No. 11/322,455, filed Dec. 30, 2005, Waxman.
U.S. Appl. No. 11/340,327, filed Jan. 25, 2006, Waxman.

* cited by examiner

*Primary Examiner*—Lana N Le
*Assistant Examiner*—Ping Y Hsieh
(74) *Attorney, Agent, or Firm*—Shiloh et al.

(57) ABSTRACT

Some embodiments of the invention provide devices, systems and methods of coexistence mode switching among collocated transceivers. For example, a method in accordance with an embodiment of the invention includes monitoring reception reliability of a first transceiver in relation to concurrent transmission activity of a second, collocated, transceiver; and based on the monitoring, setting a flag indicating a request by the first transceiver that the second transceiver modify its coexistence mode.

18 Claims, 3 Drawing Sheets

DEVICE, SYSTEM AND METHOD OF COEXISTENCE MODE SWITCHING AMONG TRANSCEIVERS

BACKGROUND OF THE INVENTION

In the field of wireless communications, a first wireless communication station may include multiple wireless transceivers, for example, a first transceiver able to operate in accordance with a first wireless communication standard or protocol, and a second transceiver able to operate in accordance with a second wireless communication standard or protocol.

The first transceiver may transmit a first wireless signal, thereby interfering with operations of the second transceiver, for example, with a scanning operation in which the second transceiver scans for an incoming wireless signal intended for reception, or with a receiving operation in which the second transceiver receives an incoming wireless signal.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
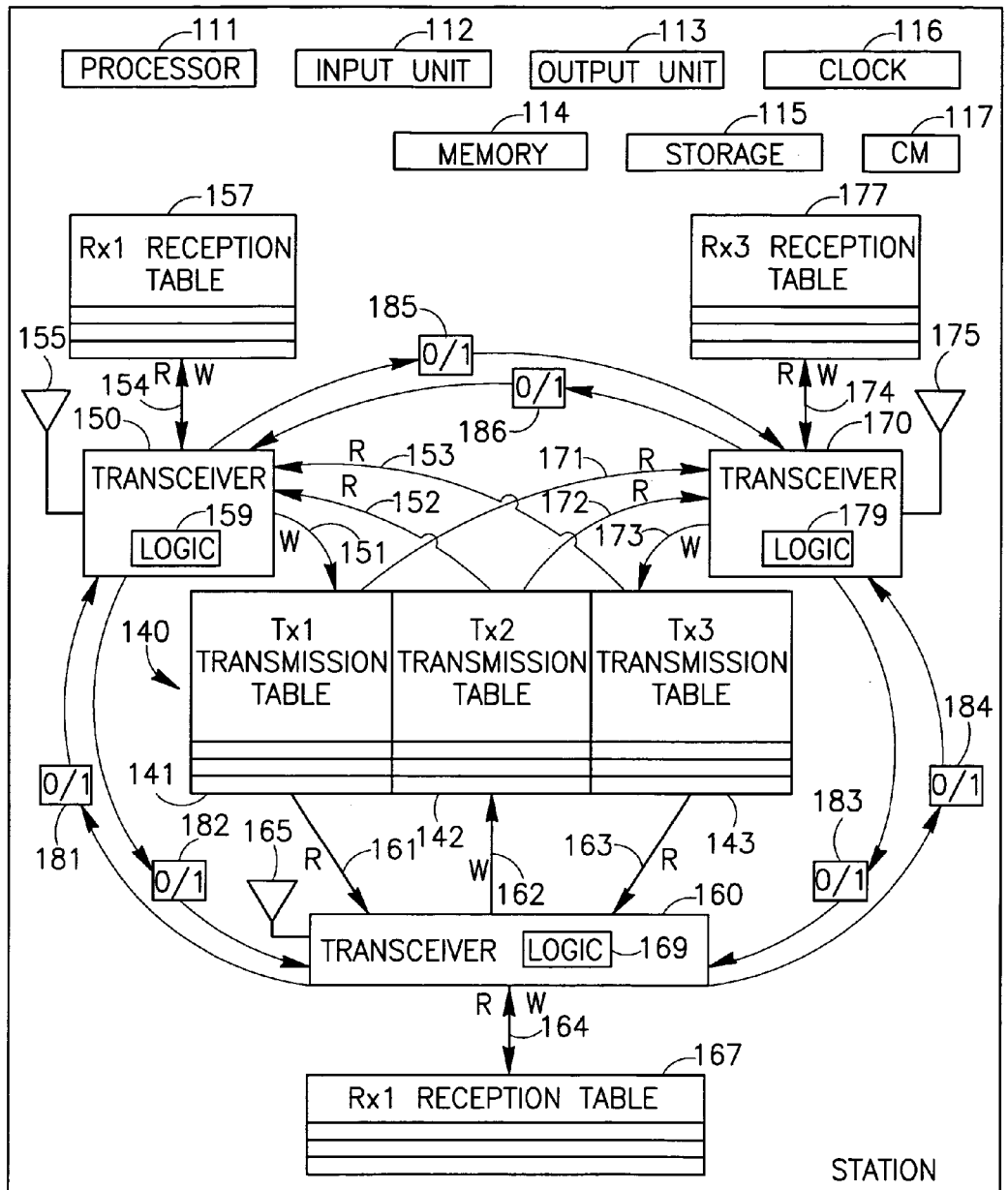
FIG. 1 is a schematic block diagram illustration of a wireless communication system utilizing coexistence mode switching among collocated transceivers in accordance with an embodiment of the invention.
Figure 1:
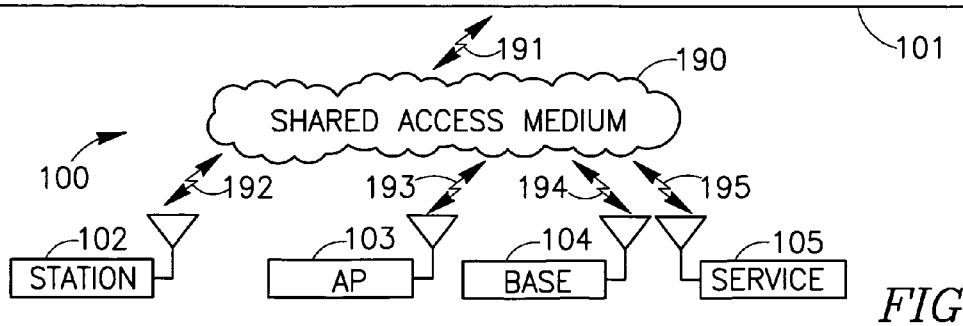

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a tablet computer, a server computer, a Personal Digital Assistant (PDA) device, a network, a wireless network, a Local Area Network (LAN), a Wireless LAN (WLAN), devices and/or networks operating in accordance with existing IEEE 802.11, 802.11a, 802.11b, 802.11e, 802.11g, 802.11h, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the terms "coexistence mode" and/or "transmission mode" as used herein may include, for example, a mode of transmission characterized by one or more properties or values of parameters, e.g., modulation mode, power mode, transmission using a certain frequency, transmission using a certain frequency band, transmission using a certain frequency bin, transmission using a certain cluster of frequency bins, transmission using a certain antenna or antennas, transmission using a certain power level, transmission using a certain coexistence method or mode, transmission using a certain set values of parameters, or the like. In some embodiments, optionally, a wireless communication device or a transmitter thereof may be able to utilize multiple coexistence modes and/or multiple transmission modes, e.g., multiple pre-set coexistence modes and/or transmission modes, may be able to switch among coexistence modes and/or transmission modes, may be able to switch from a first coexistence mode and/or transmission mode to a second coexistence mode and/or transmission mode, may be able to select one out of multiple pre-set coexistence modes and/or transmission modes, or the like.

For example, in some embodiments, a first coexistence mode and/or transmission mode may include transmitting using a first frequency, whereas a second, different, coexistence mode and/or transmission mode may include transmitting using a second, different, frequency; a first coexistence mode and/or transmission mode may include transmitting using a first frequency band, whereas a second, different, coexistence mode and/or transmission mode may include transmitting using a second, different, frequency band; a first coexistence mode and/or transmission mode may include transmitting using a first frequency bin, whereas a second, different, coexistence mode and/or transmission mode may include transmitting using a second, different, frequency bin; a first coexistence mode and/or transmission mode may include transmitting using a first cluster of frequency bins, whereas a second, different, coexistence mode and/or transmission mode may include transmitting using a second, different, cluster of frequency bins; a first coexistence mode and/or transmission mode may include transmitting using a first antenna, whereas a second, different, coexistence mode and/or transmission mode may include transmitting using a second, different, antenna; a first coexistence mode and/or transmission mode may include transmitting using a first power level, whereas a second, different, coexistence mode and/or transmission mode may include transmitting using a second, different, power level; a first coexistence mode and/or transmission mode may include transmitting using a first set of values of parameters, whereas a second, different, coexistence mode and/or transmission mode may include transmitting using a second, different, set of values of parameters; or the like.

FIG. 1 schematically illustrates a block diagram of a wireless communication system 100 utilizing coexistence mode switching among collocated transceivers in accordance with an embodiment of the invention. System 100 may include one or more wireless communication stations, for example, stations 101 and 102. System 100 may optionally include other wireless devices, for example, an Access Point (AP) 103, a base station 104, a service station 105, or the like. Station 101, station 102, AP 103, base station 104 and service station 105 may communicate using a shared access medium 190, for example, through wireless communication links 191, 192, 193, 194 and 195, respectively.

In some embodiments, system 100 may be or may include one or more wireless communication networks, for example, an a-synchronic wireless network or an asynchronous wireless network, and/or a synchronic wireless network. For example, in one embodiment, station 101 and AP 103 may be able to operate in accordance with a first wireless communication standard, e.g., IEEE 802.11 standard, which may be a-synchronic, asynchronous, burstable, or the like; whereas station 102 and base station 104 may be able to operate in accordance with a second wireless communication standard, e.g., IEEE 802.16 standard, which may be synchronic, non-burstable, or the like.

In some embodiments, for example, station 101 may be a hybrid wireless communication device, e.g., having multiple wireless transceivers able to operate in accordance with multiple wireless communication standards, respectively, for example, synchronic and/or asynchronous standards, IEEE 802.16 standard and/or IEEE 802.11 standard, BlueTooth® standard, or the like.

Station 101 may include, for example, a processor 111, an input unit 112, an output unit 113, a memory unit 114, and a storage unit 115. Station 101 may further include multiple wireless transceivers, for example, transceivers 150, 160 and 170, and one or more antennas, for example, antennas 155, 165 and 175. Station 101 may optionally include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a controller, a chip, a microchip, one or more circuits, an Integrated Circuit (IC), or any other suitable multi-purpose or specific processor or controller. Processor 111 may, for example, process signals and/or data transmitted and/or received by station 101.

Input unit 112 may include, for example, a keyboard, a keypad, a mouse, a touch-pad, a microphone, or other suitable pointing device or input device. Output unit 113 may include, for example, a Cathode Ray Tube (CRT) monitor or display unit, a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units. Memory unit 114 and/or storage unit 115 may, for example, store data transmitted and/or received by station 101.

Transceiver 150, transceiver 160 and/or transceiver 170 may include, for example, a wireless Radio Frequency (RF) transceiver able to transmit and/or receive wireless RF signals, e.g., through antenna 155, antenna 165 and/or antenna 175, respectively. In some embodiments, for example, transceiver 150, transceiver 160 and/or transceiver 170 may be implemented using a transmitter, a receiver, a transmitter-receiver, or one or more units able to perform separate or integrated functions of transmitting and/or receiving wireless communication signals, blocks, frames, transmission streams, packets, messages and/or data. In one embodiment, for example, two or more of transceivers 150, 160 and/or 170 may be implemented using a single component, e.g., a dual-transceiver card or modem, a multiple-transceiver card or modem, or the like. Additionally or alternatively, for example, transceivers 150, 160 and/or 170 may optionally be otherwise collocated within a single modem, card, wireless communication unit, wireless communication component, or the like.

Antenna 155, antenna 165 and/or antenna 175 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, transceiver 150 may be able to operate in accordance with a first wireless communication standard or protocol, e.g., IEEE 802.11 standard; transceiver 160 may be able to operate in accordance with a second, different, wireless communication standard or protocol, e.g., IEEE 802.16 standard; and transceiver 170 may be able to operate in accordance with a third, different, wireless communication standard or protocol, e.g., Bluetooth®. Other suitable wireless communication standards or protocols may be used.

In some embodiments, transceiver 150 may be able to operate in accordance with a first wireless communication standard, e.g., IEEE 802.11 standard, which may be a-synchronic, asynchronous, burstable, or the like; whereas transceiver 160 may be able to operate in accordance with a second wireless communication standard, e.g., IEEE 802.16 standard, which may be synchronic, non-burstable, or the like.

Station 101 may further include a transmission registry 140, for example, able to store information related to transmissions performed by transceivers 150, 160 and 170. For example, transmission registry 140 may include a first transmission table 141 able to store information related to transmissions performed by transceiver 150; a second transmission table 142 able to store information related to transmissions performed by transceiver 160; and a third transmission table 143 able to store information related to transmissions performed by transceiver 170. In some embodiments, transmission registry 140 may be implemented, for example, as part of memory unit 114, as part of storage unit 115, as a separate unit or sub-unit of station 101, or the like. In one embodiment, for example, transmission table 141, transmission table 142 and/or transmission table 143 may be implemented using a table, a list, a database, a buffer, a cyclic buffer, a shared buffer, a non-shared buffer, a distributed buffer utilizing a shared bus, or the like.

In some embodiments, a transceiver may be able to write values into a single transmission table, and may be able to read values from the other two tables or from substantially all the transmission tables. For example, transceiver 150 may be able to write values (arrow 151) into transmission table 141, and may be able to read values (arrows 152 and 153) from transmission tables 142 and 143; transceiver 160 may be able to write values (arrow 161) into transmission table 142, and may be able to read values (arrows 161 and 163) from transmission tables 141 and 143; and transceiver 170 may be able to write values (arrow 173) into transmission table 143, and may be able to read values (arrows 171 and 172) from transmission tables 141 and 141.

Transceivers 150, 160 and 170 may write into transmission tables 141, 142 and 143, respectively, information related to transmissions performed by transceivers 150, 160 and 170, respectively. The information may include, for example, transmission activity time intervals. For example, an entry in transmission table 141 may indicate a beginning time stamp and an ending time stamp of a transmission performed by transceiver 150; an entry in transmission table 142 may indicate a beginning time stamp and an ending time stamp of a transmission performed by transceiver 160; and an entry in transmission table 143 may indicate a beginning time stamp and an ending time stamp of a transmission performed by transceiver 170. For example, an entry in transmission table 141 may indicate that a transmission by the corresponding transceiver 150 began at a time stamp of 7 microseconds and ended at a time stamp of 13 microseconds. Transmission table 141, transmission table 142 and/or transmission table 143 may include multiple entries; and may optionally be implemented using a cyclic buffer, e.g., such that a newly-written entry replaces an oldest-written entry. In some embodiments, transmission tables 141, 142 and 143 may include other suitable information related to transmissions, for example, an indication of a transmission channel used in a transmission, an indication of an antenna (e.g., out of multiple antennas) used in a transmission, or the like.

In some embodiments, transceivers 150, 160 and 170 may write values into transmission tables 141, 142 and 143, respectively, periodically or in certain time intervals. In some embodiments, transceivers 150, 160 and 170 may be synchronized or co-synchronized, e.g., may share a common timing mechanism. For example, in one embodiments, transceivers 150, 160 and 170 may be operatively connected to a clock 116, e.g., of station 101 and/or of processor 111, which may provide a common timing mechanism for transceivers 150, 160 and 170. In another embodiment, for example, software-based and/or hardware-based synchronization mechanisms may be used to synchronize among transceivers 150, 160 and 170. In yet another embodiment, transceiver 150 may operate as a "master" unit having autonomous time stamps or timing mechanism, whereas transceivers 160 and 170 may operate as "slave" units able to synchronize to the time stamps or timing mechanisms of transceiver 150. Other suitable synchronization or collaboration methods may be used.

Transceiver 150, transceiver 160 and transceiver 170 may be associated with a reception table 157, a reception table 167 and a reception table 177, respectively, able to store information related to signal reception by transceiver 150, transceiver 160 and transceiver 170, respectively. For example, reception table 157 may store information related to signal reception by transceiver 150; reception table 167 may store information related to signal reception by transceiver 160; and reception table 177 may store information related to signal reception by transceiver 170. In some embodiments, reception tables 157, 167 and 177 may be implemented, for example, as part of memory unit 114, as part of storage unit 115, as a separate unit or sub-unit of station 101, or the like. In one embodiment, for example, reception table 157, reception table 167 and/or reception table 177 may be implemented using a table, a list, a database, a buffer, a shared buffer, a non-shared buffer, a cyclic buffer, or the like. In some embodiments, Transceivers 150, 160 and 170 may write into reception tables 157, 167 and 177, respectively, information related to signal reception by transceivers 150, 160 and 170, respectively. The information may include, for example, reception activity time intervals, and downlink reliability parameters (e.g., reception reliability parameter, a value of a reception reliability metric, or the like) corresponding to the reception activity time intervals. For example, an entry in reception table 157 may indicate a beginning time stamp and an ending time stamp of a reception interval of transceiver 150, as well as one or more downlink reliability parameters corresponding to that reception interval; an entry in reception table 167 may indicate a beginning time stamp and an ending time stamp of a reception interval of transceiver 160, as well as one or more downlink reliability parameters corresponding to that reception interval; and an entry in reception table 177 may indicate a beginning time stamp and an ending time stamp of a reception interval of transceiver 170, as well as one or more downlink reliability parameters corresponding to that reception interval. In some embodiments, the one or more downlink reliability parameters may include, for example, a rate parameter, a throughput parameter, a rate change parameter, a rate change indication, a signal power parameter, a noise floor parameter, or the like. For example, an entry in reception table 157 may indicate that reception by the corresponding transceiver 150 began at a time stamp of 12 microseconds and ended at a time stamp of 15 microseconds. Reception table 157, reception table 167 and/or reception table 177 may include multiple entries; and may optionally be implemented using a cyclic buffer, e.g., such that a newly-written entry replaces an oldest-written entry.

In some embodiments, a transceiver may be able to write values into, and to read values from, a single reception table associated with that transceiver. For example, transceiver 150 may be able to write values into, and to read values from, reception table 157 (arrow 154); transceiver 160 may be able to write values into, and to read values from, reception table 167 (arrow 164); and transceiver 170 may be able to write values into, and to read values from, reception table 177 (arrow 174).

In some embodiments, a transceiver may search for correlation between a time interval of degraded reception reliability of that transceiver, and a time interval (e.g., a concurrent time interval) of transmission activity of one or more other transceivers. For example, transceiver 150 may read or search the contents of reception table 157, and may identify a time interval in which the value of the downlink reliability parameter is low, e.g., below a pre-defined threshold. Transceiver 150 may read or search the contents of transmission table 142 (associated with transceiver 160) and/or transmission table 143 (associated with transceiver 170), and may determine that the time interval of degraded reception reliability of transceiver 150 corresponds to, or partially or substantially entirely overlaps with, a time interval of transmission activity by transceiver 160 and/or transceiver 170, respectively.

For example, transceiver 150 may determine, based on monitoring and/or a correlation analysis between an entry of reception table 157 and (or in relation to) an entry of transmission table 142, that during the time interval in which transceiver 150 had a degraded (e.g., low or decreased) reception reliability, transceiver 160 performed a transmission activity. This may allow transceiver 150 to determine that transmission activity by transceiver 160 may interfere with concurrent reception activity by transceiver 150.

In contrast, for example, transceiver 150 may determine, based on monitoring and/or a correlation analysis between an entry of reception table 157 and (or in relation to) an entry of transmission table 143, that during the time interval in which transceiver 150 had a non-degraded (e.g., acceptable or high) reception reliability, transceiver 170 performed a transmission activity. This may allow transceiver 150 to determine that transmission activity by transceiver 170 may not interfere with concurrent reception activity by transceiver 150.

Based on the determination(s) resulting from the reception/transmission correlation analysis or monitoring, transceiver 150 may set or reset one or more flags indicating a request that another transceiver modify, or maintains, its coexistence mode and/or transmission mode. A flag may be implemented, for example, using a memory unit (e.g., a one-bit flag), able to store a value of "1" to indicate a request of a first transceiver to modify a coexistence mode and/or transmission mode of a second transceiver, and able to store a value of "0" to indicate a request of a first transceiver that the second transceiver maintains its coexistence mode and/or transmission mode; or vice versa. Other types of flags or indications may be used to signal a request, or an absence of a request, of a first transceiver that a second transceiver modify or maintain its coexistence mode and/or transmission mode.

For example, based on the determination by transceiver 150, that transmission activity by transceiver 160 may interfere with concurrent reception activity by transceiver 150, the transceiver 150 may set a flag 181 (e.g., by writing a value of "1" to the flag 181), thereby indicating that transceiver 160 is requested to modify its coexistence mode and/or transmission mode. Transceiver 160 may check the value of flag 181, e.g., periodically or at certain time intervals, and may determine to modify the coexistence mode and/or transmission mode of transceiver 160 based on the value of flag 181, or based on an analysis of one or more criteria taking into account the value of flag 181. For example, transceiver 160 may modify its coexistence mode and/or transmission mode, e.g., from a first coexistence mode and/or transmission mode to a second, different coexistence mode and/or transmission mode (e.g., out of a predefined set of multiple coexistence modes and/or transmission modes), in response to the setting of flag 181 to indicate that the modification is requested by transceiver 150.

In contrast, based on the determination by transceiver 150, that transmission activity by transceiver 170 may not interfere with concurrent reception activity by transceiver 150, the transceiver. 150 may reset a flag 185 (e.g., by writing a value of "0" to the flag 185), thereby indicating that transceiver 170 is not requested to modify its coexistence mode and/or transmission mode, or that transceiver 170 is requested to maintain its coexistence mode and/or transmission mode. Transceiver 170 may check the value of flag 185, e.g., periodically or at certain time intervals, and may determine to maintain the coexistence mode and/or transmission mode of transceiver 170 based on the value of flag 185, or based on an analysis of one or more criteria taking into account the value of flag 185. For example, transceiver 170 may maintain its coexistence mode and/or transmission mode, e.g., may avoid changing its coexistence mode and/or transmission mode from a first coexistence mode and/or transmission mode to a second, different coexistence mode and/or transmission mode (e.g., out of a pre-defined set of multiple coexistence modes and/or transmission modes), in response to the resetting of flag 185 to indicate that modification is not requested by transceiver 150.

In some embodiments, for example, multiple flags 181-186 may be used to indicate a request by a first transceiver that a second transceiver modify or maintain its coexistence mode and/or transmission mode. For example, with regard to transceivers 150, 160 and 170, flag 181 may be used to indicate a request by transceiver 150 that transceiver 160 modify or maintain its coexistence mode and/or transmission mode; flag 182 may be used to indicate a request by transceiver 160 that transceiver 150 modify or maintain its coexistence mode and/or transmission mode; flag 183 may be used to indicate a request by transceiver 170 that transceiver 160 modify or maintain its coexistence mode and/or transmission mode; flag 184 may be used to indicate a request by transceiver 160 that transceiver 170 modify or maintain its coexistence mode and/or transmission mode; flag 185 may be used to indicate a request by transceiver 150 that transceiver 170 modify or maintain its coexistence mode and/or transmission mode; and flag 186 may be used to indicate a request by transceiver 170 that transceiver 150 modify or maintain its coexistence mode and/or transmission mode.

In some embodiments, a transceiver may take into account the value(s) of one or more flags 181-186 in order to determine whether to modify or maintain its coexistence mode and/or transmission mode. For example, in one embodiment, if the value of flag 185 is "1", indicating that transceiver 150 requests that transceiver 170 modify its coexistence mode and/or transmission mode, and additionally the value of flag 184 is "1", indicating that transceiver 160 requests that transceiver 170 modify its coexistence mode and/or transmission mode, then transceiver 170 may modify its coexistence mode and/or transmission mode, or may allocate a higher weight to the two modification requests relative to a weight of a single modification request from a single transceiver. In one embodiment, for example, transceiver 170 may modify its coexistence mode and/or transmission mode if at least one other transceiver (i.e., transceiver 150 and/or transceiver 160) requests that transceiver 170 modify its coexistence mode and/or transmission mode.

In some embodiments, for example, transceiver 150 may repeatedly or periodically update the value of flag 185, thereby providing a prolonged or continuous request that transceiver 170 modify or maintain its coexistence mode and/or transmission mode. For example, based on monitoring or an analysis of past reception reliability of transceiver 150 correlated with (or in relation to) past transmission activity of transceiver 170, transceiver 150 may request that transceiver 170 modify its coexistence mode and/or transmission mode, e.g., by setting the value of flag 185 to "1". Transceiver 170 may thus modify its coexistence mode and/or transmission mode, e.g., from a first coexistence mode and/or transmission mode to a second coexistence mode and/or transmission mode. During a subsequent time period, entries of transmission table 143 (associated with transmissions of transceiver 170) may be updated based on transmissions that transceiver 170 performs in the subsequent time period using the second coexistence mode and/or transmission mode; whereas entries of reception table 157 (associated with reception by transceiver 150) may be updated based on reception activity of transceiver 150 in the subsequent time period. Transceiver 150 may perform monitoring or an analysis of reception reliability of transceiver 150 in the subsequent time period, correlated with (or in relation to) transmission activity of transceiver 170 in the subsequent time period. Based on the monitoring or analysis results, transceiver 150 may determine whether to maintain the value of flag 185 as "1", indicating that transceiver 150 continues to request that transceiver 170 modify its coexistence mode and/or transmission mode; or, alternatively, to modify the value of flag 185 into "0", indicating that transceiver 150 does not request any more that transceiver 150 modify its coexistence mode and/or transmission mode. If the value of flag 185 is "1", transceiver 170 may modify its coexistence mode and/or transmission mode, for example, from the second coexistence mode and/or transmission mode to another, third, coexistence mode and/or transmission mode. In some embodiments, for example, transceiver 170 may periodically rotate or switch among multiple coexistence modes and/or transmission modes, as long as the value of flag 185 is "1", indicating a pending request by transceiver 150 that transceiver 170 modify its coexistence mode and/or transmission mode. In one embodiment, optionally, transceiver 170 may cease to modify its coexistence mode and/or transmission mode, e.g., for a pre-defined period of time, if transceiver 170 rotated through substantially all the coexistence mode and/or transmission modes available to transceiver 170 without causing transceiver 150 to reset the value of flag 185.

In some embodiments, transceiver 150 may determine that past transmissions by transceiver 170 interfered with corresponding past reception activity by transceiver 150. In one embodiment, upon determination that transmission activity by transceiver 170 degrades the reception activity of transceiver 150, transceiver 150 may set the flag 185, thereby indicating a request that transceiver 170 modify its coexistence mode and/or transmission mode. In another embodiment, transceiver 150 may set the flag 185 only if the degradation in reception activity of transceiver 150, correlated with transmission activity of transceiver 170, is a significant degradation, a non-acceptable degradation, an intolerable degradation, or a degradation greater than a pre-defined threshold value. For example, transceiver 150 may determine that a certain degradation in its reception reliability, due to interfering transmission activity by transceiver 170, is acceptable or tolerable, and may not require setting the flag 185, i.e., may not require requesting from transceiver 170 to modify its coexistence mode and/or transmission mode.

In some embodiments, multiple flags 181-186 may be implemented using multiple, respective, one-bit memory units, or other single-bit interface (e.g., a single-bit output at a first transceiver and a single-bit input at a second transceiver). For example, in some embodiment, a single-bit interface or a single-bit of memory or storage may be utilized to indicate a request by transceiver 150 that transceiver 170 modify its coexistence mode and/or transmission mode. For example, a modification request may set the flag 185; and transceiver 170 may, for example, periodically access (e.g., read) the flag 185 to determine whether a coexistence mode and/or transmission mode modification is requested by transceiver 150. In some embodiments, the single-bit interface may be implemented, for example, utilizing software components and/or hardware components, for example, single-bit memory or storage unit, a single-bit portion of memory unit 114 or storage unit 115, one or more wire(s) or hard-wired link(s) among transceivers 150, 160 and/or 170, driver level or application level mechanism, MAC level mechanism, or the like.

In one embodiment, for example, transceiver 150 may include a transceiver able to operate in accordance with IEEE 802.11 standard, whereas transceiver 170 may include a transceiver able to operate in accordance with Bluetooth™ standard. Based on monitoring or an analysis of, and correlation between, entries of reception table 177 and transmission table 141, the Bluetooth™ transceiver 170 may determine that transmission activity by the IEEE 802.11 transceiver 150 interferes with the reception of the Bluetooth™ transceiver 170, e.g., degrades the reception reliability of the Bluetooth™ transceiver 170. The Bluetooth™ transceiver 170 may request that the IEEE 802.11 transceiver 150 modify its coexistence mode and/or transmission mode, e.g., using the flag 186 or other single-bit interface or other interface. The IEEE 802.11 transceiver 150 may take the request into account, e.g., in addition to or instead of taking into account a priority signal from the Bluetooth™ transceiver 170 (e.g., a priority signal or a signal of other reclaiming interface, for example, if the Bluetooth™ transceiver 170 receives data representing voice or other high-priority data). For example, the IEEE 802.11 transceiver 150 may switch or modify its coexistence mode and/or transmission mode by skipping (e.g., avoiding using) a certain frequency for subsequent transmissions, thereby possibly reducing the interference with the concurrent reception by the Bluetooth™ transceiver 170.

In another embodiment, for example, transceiver 150 may include a transceiver able to operate in accordance with IEEE 802.11g standard, whereas transceiver 170 may include a transceiver able to operate in accordance with Bluetooth™ standard and able to perform Adaptive Frequency Hopping (AFH). Based on monitoring or an analysis of, and correlation between, entries of reception table 157 and transmission table 143, the IEEE 802.11g transceiver 150 may determine that transmission activity by the Bluetooth™ transceiver 170 interferes with the reception of the IEEE 802.11g transceiver 150, e.g., degrades the reception reliability of the IEEE 802.11g transceiver 150. The IEEE 802.11g transceiver 150 may request that the Bluetooth™ transceiver 170 modify its coexistence mode and/or transmission mode, e.g., using the flag 185 or other single-bit interface or other interface. Based on the coexistence mode and/or transmission mode modification request, the Bluetooth™ transceiver 170 may modify its coexistence mode and/or transmission mode, for example, may modify a frequency band used for subsequent transmissions by the Bluetooth™ transceiver 170, e.g., optionally AFH. For example, the Bluetooth™ transceiver 170 may utilize a subset of available frequencies (e.g., approximately 50 frequencies out of approximately 80 frequencies), thereby skipping (e.g., avoiding) a band of frequencies utilized by the IEEE 802.11g transceiver 150. For example, in some embodiments, three channels may be utilized for wireless communication by the IEEE 802.11g transceiver 150, and accordingly, not more than three coexistence mode and/or transmission mode modifications by the Bluetooth™ transceiver 170 may be required in order to improve the reception reliability of the IEEE 802.11g transceiver 150.

In yet another embodiment, for example, transceiver 150 may include a transceiver able to operate in accordance with IEEE 802.11 standard, whereas transceiver 160 may include a transceiver able to operate in accordance with IEEE 802.16 standard. The IEEE 802.11 transceiver 150 may be able to utilize a coexistence mechanism, for example, to avoid concurrent activity or co-interference by the IEEE 802.11 transceiver 150 and the IEEE 802.16 transceiver 160 ("coexistence mechanism"), e.g., a delayed acknowledgement (ACK) packet mechanism. The IEEE 802.16 transceiver 160 may determine, based on monitoring or an analysis of entries of reception table 167 and transmission table 141, that transmission activity by the IEEE 802.11 transceiver 150 does not interferes with the reception of the IEEE 802.16 transceiver 160, e.g., does not degrade the reception reliability of the IEEE 802.16 transceiver 160. Accordingly, the IEEE 802.16 transceiver 160 may reset the value of flag 181, thereby indicating that the IEEE 802.16 transceiver 160 does not request from the IEEE 802.11 transceiver 150 to modify its coexistence mode and/or transmission mode, or that the IEEE 802.16 transceiver 160 requests from the IEEE 802.11 transceiver 150 to maintain its coexistence mode and/or transmission mode unmodified. The resetting of the flag 181 may be used by the IEEE 802.11 transceiver 150 as indication that the IEEE 802.11 transceiver 150 need not modify its coexistence mode and/or transmission mode, and, optionally, that the IEEE 802.11 transceiver 150 need not utilize (e.g., may deactivate) the coexistence mechanism (e.g., the delayed ACK packet mechanism). This may allow the IEEE 802.11 transceiver 150 to transmit data more efficiently, e.g., without delays or waiting periods and without taking into account a possible degradation in the reception reliability of the IEEE 802.16 transceiver 160.

In some embodiments, station 101 may optionally include a Communication Manager (CM) 117. In some embodiments, CM 117 may be implemented using a hardware component (e.g., a controller, part of transceivers 150 and/or 160 and/or 170, part of processor 111, a stand-alone unit, or the like) and/or a software component (e.g., a stand-alone software component, an application, a driver, a portion of an Operating System (OS) of station 101, or the like). CM 117 may, for example, perform monitoring and/or analysis and/or correlation of entries in the transmission registry 140 and the reception tables 157, 167 and/or 177; may set and/or reset one or more flags 181-186; may monitor (e.g., periodically) the status of one or more flags 181-186; and may transfer signals or messages among transceivers 150, 160 and/or 170, e.g., signals or messages indicating a request to modify a coexistence mode and/or transmission mode or a request to maintain a coexistence mode and/or transmission mode; may determine whether or not to modify a coexistence mode and/or transmission mode, e.g., based on a value of flags 181-186, or by taking into account a value of flags 181-186 and other criteria; and/or may perform other suitable operations with regard to modifying a coexistence mode and/or transmission mode of transceivers 150, 160 and/or 170.

In some embodiments, optionally, transceiver 150 may include a logic unit 159, transceiver 160 may include a logic unit 169, and transceiver 170 may include a logic unit 179. In some embodiments, logic units 159, 169 and/or 117 may be implemented using a hardware component (e.g., a controller, part of transceivers 150 and/or 160 and/or 170, part of processor 111, a stand-alone unit, or the like) and/or a software component (e.g., a stand-alone software component, an application, a driver, a portion of an Operating System (OS) of station 101, or the like). Logic units 159, 169 and/or 117 may, for example, perform monitoring and/or analysis and/or correlation of entries in the transmission registry 140 and (or in relation to) the reception tables 157, 167 and/or 177; may set and/or reset one or more flags 181-186; may monitor (e.g., periodically) the status of one or more flags 181-186; and may transfer signals or messages among transceivers 150, 160 and/or 170, e.g., signals or messages indicating a request to modify a coexistence mode and/or transmission mode or a request to maintain a coexistence mode and/or transmission mode; may determine whether or not to modify a coexistence mode and/or transmission mode, e.g., based on a value of flags 181-186, or by taking into account a value of flags 181-186 and other criteria; and/or may perform other suitable operations with regard to modifying a coexistence mode and/or transmission mode of transceivers 150, 160 and/or 170.

Although portions of the discussion herein may relate, for demonstrative purposes, to setting a flag to indicate a request to modify a coexistence mode and/or transmission mode, and resetting a flag to indicate a request to maintain a coexistence mode and/or transmission mode or an absence of a request to modify a coexistence mode and/or transmission mode, embodiments of the invention are not limited in this regard, and other signaling mechanism or indications may be used. In some embodiments, the signaling mechanism may include a single-bit mechanism or interface, a binary flag, a binary parameter, a bit, a true/false parameter or indication, an on/off parameter or indication, a modify/maintain parameter or indication, or the like. In other embodiments, other types of messages (e.g., non-binary or non single-bit) may be used.

Although portions of the discussion herein may relate, for demonstrative purposes, to a single-bit interface, a single-bit flag or indication, a binary flag or indication, an on/off flag or indication, or the like, embodiments of the invention are not limited in this regard. For example, in some embodiment, a multi-state flag or indication may be used to indicate a request of a first transceiver that a second transceiver modify (or maintain) its coexistence mode and/or transmission mode, e.g., the multi-states corresponding to multiple coexistence modes and/or transmission modes (e.g., pre-set coexistence modes and/or transmission modes) of the second transceiver. For example, in one embodiment, a multi-state flag or indication may have a first value (e.g., a value of "0") to indicate a request by a first transceiver that a second transceiver maintain its coexistence mode and/or transmission mode; a second value (e.g., a value of "1") to indicate a request by the first transceiver that the second transceiver modify its coexistence mode and/or transmission mode to a certain, first, pre-set coexistence mode and/or transmission mode; a third value (e.g., a value of "2") to indicate a request by the first transceiver that the second transceiver modify its coexistence mode and/or transmission mode to a certain, second, pre-set coexistence mode and/or transmission mode; or the like. For example, multiple values (e.g., integer values) may be assigned to the multi-state flag or indication, corresponding to multiple, respective, pre-set coexistence modes and/or transmission modes of the second transceiver.

Figure 2:
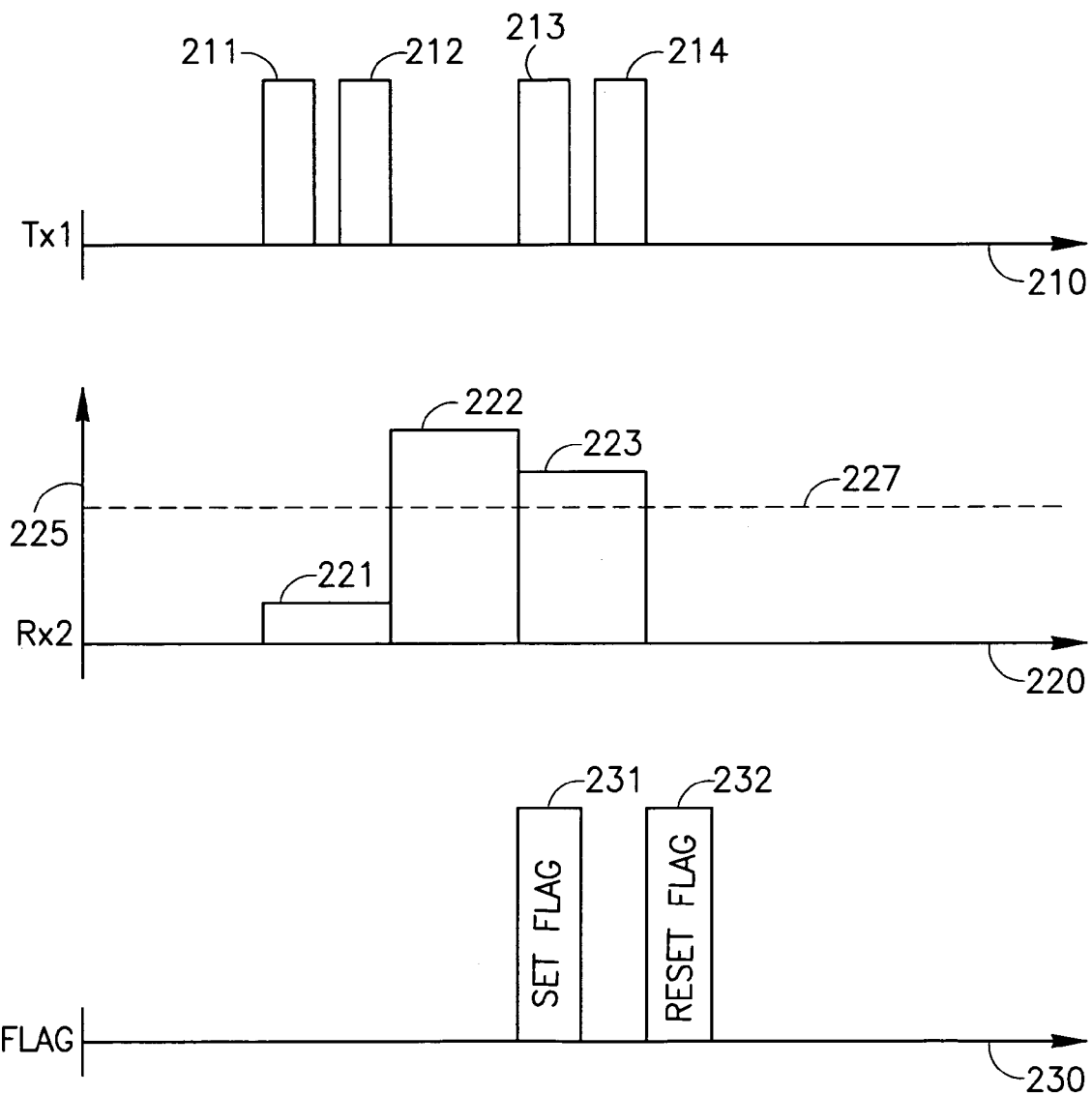
FIG. 2 is a schematic timing diagram of wireless communication signals in accordance with an embodiment of the invention.

FIG. 2 schematically illustrates a timing diagram of wireless communication signals in accordance with an embodiment of the invention. A horizontal axis 210 may indicate, for example, timing of wireless communication signals transmitted by a first transceiver of a wireless communication station. For example, blocks 211-212 may indicate a first period of transmission activity by the first transceiver, and blocks 213-214 may indicate a second, subsequent, period of transmission activity by the first transceiver.

A horizontal axis 220 may indicate, for example, timing of reception reliability (e.g., downlink quality or downlink reliability) of a second transceiver of the wireless communication station. A vertical axis 225 may indicate reception reliability. A line 227 may indicate a threshold value of reception reliability, e.g., a minimum reception reliability value which may be acceptable or tolerable.

For example, a block 221 may indicate a time period in which the second transceiver has a significantly degraded reception reliability (e.g., significantly below the threshold value 227); a block 222 may indicate a time period in which the second transceiver has an acceptable reception reliability (e.g., above the threshold value 227); and a block 223 may indicate a time period in which the second transceiver has reception reliability which is acceptable (e.g., above the threshold value 227) by slightly degraded relative to the reception reliability of block 222.

The second transceiver may correlate between blocks 211-212 and block 221. For example, the second transceiver may determine that the period of low reception reliability of the second transceiver (block 221) overlaps with the period of transmission activity of the first transceiver (blocks 211-212). This may indicate, for example, that transmission activity by the first transceiver may interfere with the reception reliability of the second transceiver.

Furthermore, the second transceiver may determine that the period of high reception reliability of the second transceiver (block 222) does not correlate with any concurrent transmission activity of the first transceiver (e.g., does not overlap with any of blocks 211-214). This may indicate, for example, that absence of transmission activity by the first transceiver may increase or contribute to the reception reliability of the second transceiver.

Based on the above correlations, the second transceiver may set a flag (block 231), indicating that the second transceiver requests that the first transceiver modify, its coexistence mode and/or transmission mode; as shown at horizontal axis 230 which indicates timing of status modification of the flag representing a request that the first transceiver modify its coexistence mode and/or transmission mode.

In response to the setting of the flag (block 231), the first transceiver may modify its coexistence mode and/or transmission mode; for example, the transmission activity of blocks 211-212 may be performed by the first transceiver using a first coexistence mode and/or transmission mode, whereas the transmission activity of the blocks 213-214 may be performed by the first transceiver using a second, different, coexistence mode and/or transmission mode.

Subsequent to the second period of transmission activity (e.g., subsequent to blocks 213-214), the second transceiver may correlate between blocks 213-214 and block 223. For example, the second transceiver may determine that the period of slightly degraded yet acceptable reception reliability of the second transceiver (block 223) overlaps with the period of transmission activity of the first transceiver (blocks 213-214) in which the second coexistence mode and/or transmission mode was utilized. This may indicate, for example, that transmission activity by the first transceiver using the second (e.g., modified) coexistence mode and/or transmission mode does not interfere with the reception reliability of the second transceiver. Based on this correlation, the second transceiver may reset the flag (block 232), indicating that the second transceiver no longer requests that the first transceiver modify its coexistence mode and/or transmission mode, or indicating that the second transceiver requests that the first transceiver maintain its coexistence mode and/or transmission mode.

Figure 3:
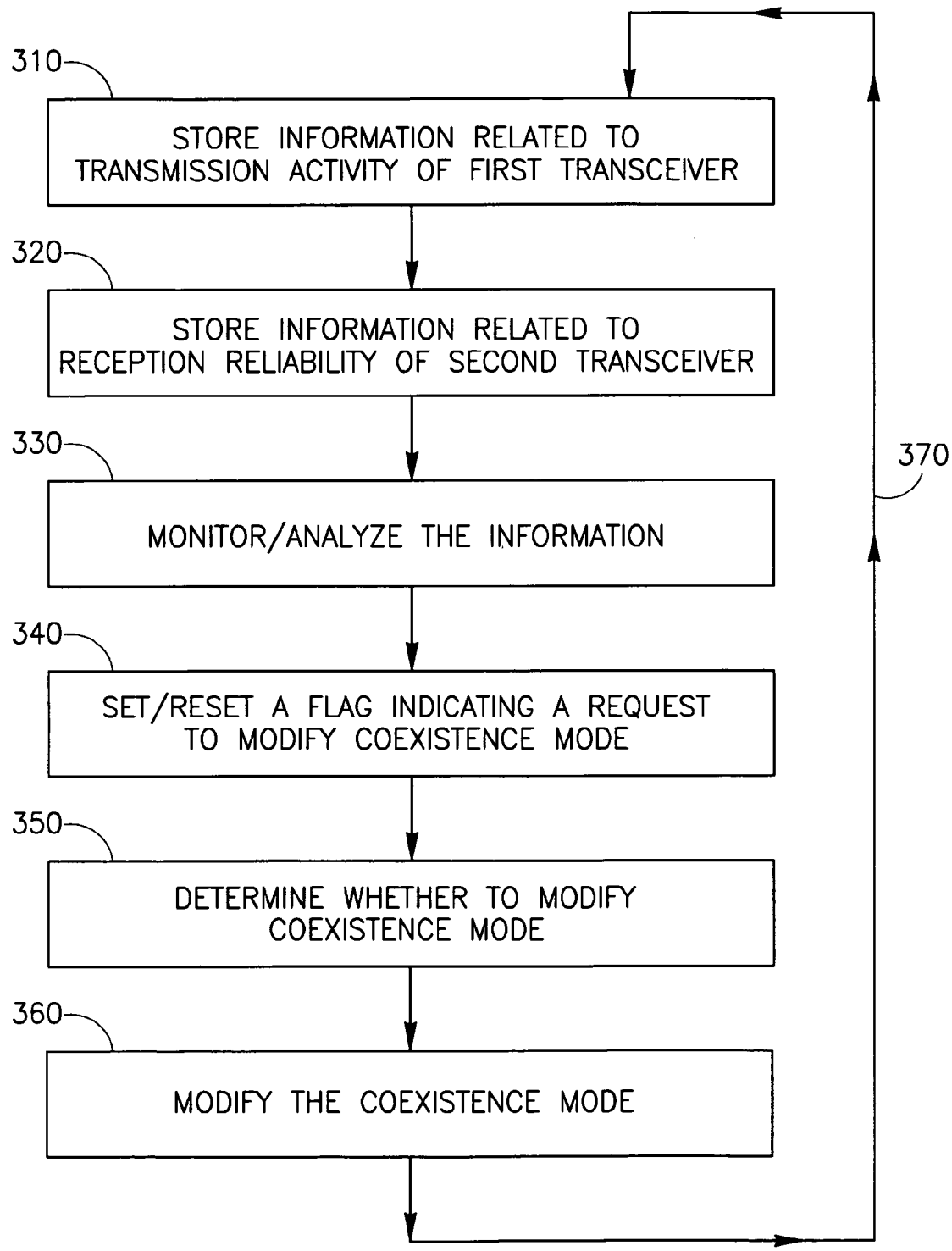
FIG. 3 is a schematic flow-chart of a method of coexistence mode switching among collocated transceivers in accordance with an embodiment of the invention.

FIG. 3 is a schematic flow-chart of a method of coexistence mode switching among collocated transceivers in accordance with an embodiment of the invention. Operations of the method may be implemented, for example, by system 100 of FIG. 1, by station 101 of FIG. 1, by transceivers 150, 160 and/or 170 of FIG. 1, and/or by other suitable transceivers, units, stations, devices, and/or systems.

As indicated at box 310, the method may include, for example, storing information related to transmission activity of a first transceiver. This may include, for example, storing time stamps indicating beginning and ending of transmission activities performed by the first transceiver.

As indicated at box 320, the method may include, for example, storing information related to reception reliability of a second transceiver (e.g., a collocated transceiver). This may include, for example, storing time stamps indicating beginning and ending of a reception period of the second transceiver, as well as a reception reliability value corresponding to that reception period.

As indicated at box 330, the method may include, for example, analyzing or monitoring the information related to the transmission activity of the first transceiver and (or in relation to) the information related to the reception reliability of the second transceiver. This may include, for example, identifying a time period in which the first transceiver performed transmission activity and, concurrently, the second transceiver's reception reliability is degraded.

As indicated at box 340, the method may include, for example, based on the monitoring or analysis result, setting (or resetting) a flag indicating a request by the second transceiver that the first transceiver modify (or maintain) its coexistence mode and/or transmission mode. For example, if the analysis or monitoring of box 330 determines that the reception reliability of the second transceiver degrades during a concurrent transmission activity by the first transceiver, a flag may be set to indicate a request by the second transceiver that the first transceiver modify its coexistence mode and/or transmission mode. In contrast, if the analysis or monitoring of box 330 determines that the reception reliability of the second transceiver does not degrade during a concurrent transmission activity by the first transceiver, the flag may be reset to indicate a request by the second transceiver that the first transceiver maintains its coexistence mode and/or transmission mode.

As indicated at box 350, the method may include, for example, determining (e.g., by the first transceiver) whether to modify the coexistence mode and/or transmission mode of the first transceiver. In one embodiment, for example, the determination may be based (e.g., substantially exclusively) on the status or value of the flag, e.g., based on whether or not the second transceiver requests that the first transceiver modify (or maintain) its coexistence mode and/or transmission mode. In another embodiment, for example, the determination may take into account (e.g., among other criteria) the status or value of the flag, e.g., may take into account whether or not the second transceiver requests that the first transceiver modify (or maintain) its coexistence mode and/or transmission mode.

As indicated at box 360, the method may include, for example, modifying the coexistence mode and/or transmission mode of the first transceiver, e.g., if it is determined (box 350) to modify the coexistence mode and/or transmission mode of the first transceiver.

Optionally, as indicated by arrow 370, the method may include, for example, repeating some or all of the above operations, e.g., periodically, upon demand, upon a user's request, when a pre-defined condition is met, at pre-defined time intervals, continuously, substantially continuously, or the like.

Other operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    storing reception reliability information of at least one first transceiver;
    storing transmission activity information of at least one second, collocated, transceiver;
    monitoring reception reliability of the first transceiver during one or more time intervals in which transmission activity is simultaneously performed by the second transceiver;
    detecting a degraded reception reliability of the first transceiver, which is below a predefined reception reliability threshold;
    comparing the transmission activity information to the reception reliability information to detect correlation between degraded reception reliability of the first transceiver and the concurrent transmission activity of the second transmission;
    if the degraded reception reliability of the first transceiver is correlated with the concurrent transmission activity of the second transceiver, requesting the second transceiver to modify its coexistence mode;
    monitoring reception reliability of the second transceiver during one or more time intervals in which transmission activity is simultaneously performed by the first transceiver;
    detecting a degraded reception reliability of the second transceiver; and
    if the degraded reception reliability of the second transceiver is correlated with the concurrent transmission activity of the first transceiver, requesting the first transceiver to modify its coexistence mode.

2. The method of claim 1 comprising:
    if degraded reception reliability of the first transceiver is not detected during the concurrent transmission activity of the second transceiver, requesting the second transceiver not to modify its coexistence mode.

3. The method of claim 1, wherein the at least one second transceiver includes a plurality of transceivers, and wherein the method comprises:
    identifying a transceiver of the plurality of transceivers, for which the degraded reception reliability of the first transceiver is correlated with concurrent transmission activity of the identified transceiver; and
    requesting the identified transceiver to modify its coexistence mode.

4. The method of claim 1 comprising:
    based on one or more criteria including at least the request, modifying the coexistence mode of the second transceiver from a first pre-set coexistence mode to a second pre-set coexistence mode.

5. The method of claim 1, wherein the requesting comprises setting a flag to indicate the request from the first transceiver to the second transceiver.

6. The method of claim 5 comprising:
    periodically checking a status of said flag; and
    determining whether to modify the coexistence mode of the second transceiver based on one or more criteria including at least the status of the flag.

7. An apparatus comprising:
    a plurality of collocated transceivers;
    a reception table to store reception reliability information of at least one first transceiver of the plurality of transceivers; and
    a transmission table to store transmission activity information of at least one second transceiver of the plurality of transceivers, wherein the first transceiver is to monitor reception reliability of said first transceiver during one or more time intervals in which transmission activity is simultaneously performed by the second transceiver, wherein the first transceiver is to detect a degraded reception reliability of the first transceiver, which is below a predefined reception reliability threshold, wherein the first transceiver is to compare the transmission activity information to the reception reliability information to detect correlation between degraded reception reliability of the first transceiver and the concurrent transmission activity of the second transmission and, if the degraded reception reliability of the first transceiver is correlated with the concurrent transmission activity of the second transceiver, to request the second transceiver to modify its coexistence modes, and wherein the second transceiver is to monitor reception reliability of the second transceiver during one or more time intervals in which transmission activity is simultaneously performed by the first transceiver, to detect a degraded reception reliability of the second transceiver and, if the degraded reception reliability of the second transceiver is correlated with the concurrent transmission activity of the first transceiver, to request the first transceiver to modify its coexistence mode.

8. The apparatus of claim 7, wherein said transmission table comprises a shared buffer accessible by both of said first and second transceivers, and wherein said reception table comprises a non-shared buffer accessible by said first transceiver.

9. The apparatus of claim 7, wherein the first transceiver is to request the second transceiver not to modify its coexistence mode, if degraded reception reliability of the first transceiver is not detected during the concurrent transmission activity of the second transceiver.

10. The apparatus of claim 7, wherein the first transceiver is to identify a transceiver of the plurality of transceivers, for which the degraded reception reliability of the first transceiver is correlated with concurrent transmission activity of the identified transceiver, and to request the identified transceiver to modify its coexistence mode.

11. The apparatus of claim 7 comprising a plurality of pairs of flags associated with a respective plurality of different pairs of the first and second transceivers, wherein each pair of flags includes a first flag to indicate whether or not a first transceiver of the associated pair of transceivers requests a second transceiver of the associated pair of transceivers to modify its coexistence mode, and a second flag to indicate whether or not the second transceiver of the associated pair of transceivers requests the first transceiver of the associated pair of transceivers to modify its coexistence mode.

12. The apparatus of claim 11, wherein each transceiver of the plurality of transceivers is to determine whether to modify its coexistence mode based on one or more criteria including at least the status of all flags associated with the transceiver.

13. The apparatus of claim 11, wherein the first transceiver is to set said first flag to a first state if the degraded reception reliability of the first transceiver is correlated with the concurrent transmission activity by the second transceiver, and to set said first flag to a second state if degraded reception reliability of the first transceiver is not detected in correlation with the concurrent transmission activity of the second transceiver.

14. The apparatus of claim 7, wherein the second transceiver is to determine whether to modify its coexistence mode based on one or more criteria including at least the request.

15. The apparatus of claim 14, wherein the second transceiver is to modify its coexistence mode by switching from a first pre-set coexistence mode to a second pre-set coexistence mode.

16. The apparatus of claim 7, wherein the second transceiver is to determine whether or not to modify its coexistence mode based on the request.

17. A wireless communication system comprising:
a wireless communication station comprising:
a dipole antenna to send and receive wireless communication signals;
a plurality of collocated transceivers;
a reception table to store reception reliability information of at least one first transceiver of the plurality of transceivers; and
a transmission table to store transmission activity information of at least one second transceiver of the plurality of transceivers,
wherein the first transceiver is to monitor reception reliability of said first transceiver during one or more time intervals in which transmission activity is simultaneously performed by the second transceiver,
wherein the first transceiver is to detect a degraded reception reliability of the first transceiver, which is below a predefined reception reliability threshold,
wherein the first transceiver is to compare the transmission activity information to the reception reliability information to detect correlation between degraded reception reliability of the first transceiver and the concurrent transmission activity of the second transmission and, if the degraded reception reliability of the first transceiver is correlated with the concurrent transmission activity of the second transceiver, to request the second transceiver to modify its coexistence modes,
and wherein the second transceiver is to monitor reception reliability of the second transceiver during one or more time intervals in which transmission activity is simultaneously performed by the first transceiver, to detect a degraded reception reliability of the second transceiver and, if the degraded reception reliability of the second transceiver is correlated with the concurrent transmission activity of the first transceiver, to request the first transceiver to modify its coexistence mode.

18. The wireless communication system of claim 17, wherein the first transceiver is to identify a transceiver of the plurality of transceivers, for which the degraded reception reliability of the first transceiver is correlated with concurrent transmission activity of the identified transceiver, and to request the identified transceiver to modify its coexistence mode.

* * * * *

UNITED STATES PATENT AND TRADEMARK OFFICE
CERTIFICATE OF CORRECTION

PATENT NO. : 7,634,232 B2
APPLICATION NO. : 11/385902
DATED : December 15, 2009
INVENTOR(S) : Shai Waxman It is certified that error appears in the above-identified patent and that said Letters Patent is hereby corrected as shown below:

In column 17, line 16, in Claim 7, delete "modes," and insert -- mode, --, therefor.

In column 18, line 42, in Claim 17, delete "modes," and insert -- mode, --, therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,634,232 B2
APPLICATION NO. : 11/385902
DATED : December 15, 2009
INVENTOR(S) : Shai Waxman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Twenty-first Day of December, 2010

David J. Kappos
*Director of the United States Patent and Trademark Office*